US012752803B2

(12) United States Patent
Varghese et al.

(10) Patent No.: US 12,752,803 B2
(45) Date of Patent: Oct. 6, 2026

(54) METHOD FOR SUPPORTING THE OPERATION OF A VEHICLE WITH A SENSOR UNIT, COMPUTER PROGRAM PRODUCT AND SYSTEM

(71) Applicant: Volkswagen Aktiengesellschaft, Wolfsburg (DE)

(72) Inventors: Serin Varghese, Braunschweig (DE); Jan David Schneider, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 238 days.

(21) Appl. No.: 18/578,179

(22) PCT Filed: Jul. 4, 2022

(86) PCT No.: PCT/EP2022/068386
§ 371 (c)(1),
(2) Date: Jan. 10, 2024

(87) PCT Pub. No.: WO2023/285179
PCT Pub. Date: Jan. 19, 2023

(65) Prior Publication Data

US 2024/0403607 A1 Dec. 5, 2024

(30) Foreign Application Priority Data

Jul. 14, 2021 (DE) ..................... 10 2021 207 493.6

(51) Int. Cl.
*B60W 50/04* (2006.01)
*G06N 3/045* (2023.01)
*B60W 50/02* (2012.01)

(52) U.S. Cl.
CPC ............. *B60W 50/04* (2013.01); *G06N 3/045* (2023.01); *B60W 2050/0215* (2013.01)

(58) Field of Classification Search
CPC ....... G06N 3/045; B60W 50/04; B60W 20/50
(Continued)

(56) References Cited

U.S. PATENT DOCUMENTS 11,715,020 B2 8/2023 Fischer
12,106,575 B2 * 10/2024 Hüger .............. B60W 50/0205
(Continued)

FOREIGN PATENT DOCUMENTS

CN 104732303 A 6/2015
CN 109760635 A 5/2019
(Continued)

OTHER PUBLICATIONS

"Driving Scene Understanding Using Hybrid Deep Neural Network" (Feb. 1, 2019), The IP.com Journal, Abstract (Year: 2019).*
(Continued)

*Primary Examiner* — Scott A Browne
(74) *Attorney, Agent, or Firm* — Peter Zura; LOZA & LOZA, LLP

(57) ABSTRACT

Technologies and techniques for supporting the operation of a vehicle with a sensor unit for acquiring sensor data for an evaluation in a trained, artificial neural network with a plurality of network elements for intermediate evaluations of the sensor data. Sensor data is provided for the neural network, and the sensor data is evaluated via the neural network in view of a result. A computer program product and system may be configured to evaluate the sensor data.

20 Claims, 4 Drawing Sheets

(58) Field of Classification Search
USPC .................................... 701/93, 59, 524, 522
See application file for complete search history.

(56) References Cited

U.S. PATENT DOCUMENTS

| | | | | |
|---|---|---|---|---|
| 2005/0049728 | A1 | 3/2005 | Pado | |
| 2016/0328643 | A1 | 11/2016 | Liu et al. | |
| 2019/0291720 | A1 * | 9/2019 | Xiao | G01S 13/89 |
| 2020/0050178 | A1 | 2/2020 | Gao et al. | |
| 2020/0280708 | A1 * | 9/2020 | Sato | H04N 21/21805 |
| 2021/0197859 | A1 * | 7/2021 | Canady | B60S 1/56 |
| 2022/0126864 | A1 * | 4/2022 | Moustafa | B60W 60/0013 |

FOREIGN PATENT DOCUMENTS

| | | | |
|---|---|---|---|
| CN | 110689021 | A | 1/2020 |
| CN | 210822158 | U | 6/2020 |
| CN | 112801195 | A | 5/2021 |
| DE | 202018104373 | U1 | 8/2018 |
| DE | 102019201990 | A1 | 8/2020 |
| DE | 102019218613 | A1 | 6/2021 |
| GB | 2554507 | A | 4/2018 |
| WO | 2020249755 | A1 | 12/2020 |

OTHER PUBLICATIONS

PCT/EP2022/068386. International Search Report (Mar. 11, 2022).
Priority DE Application No. 102021207493.6. Examination Report (Mar. 25, 2022).
Hnewa et al. "Objection detection under rainy conditions for autonomous vehicles." Autonomous Driving: Part 2. IEEE Signal Processing Magazine, pp. 53-67 (Jan. 2021).

* cited by examiner

METHOD FOR SUPPORTING THE OPERATION OF A VEHICLE WITH A SENSOR UNIT, COMPUTER PROGRAM PRODUCT AND SYSTEM

RELATED APPLICATIONS

The present application claims priority to International Patent Application No. PCT/EP2022/068386 to Varghese et al., filed Jul. 4, 2022, titled "Method for supporting the operation of a vehicle with a sensor unit, computer program product and system," which claims priority to German Pat. App. No. DE 10 2021 207 493.6, filed Jul. 14, 2021, to Varghese, et al., the contents of each being incorporated by reference in their entirety herein.

TECHNICAL FIELD

The present disclosure relates to technologies and techniques for supporting the operation of a vehicle with a sensor unit for acquiring sensor data for analysis in a trained, artificial neural network, a computer program product and a system.

BACKGROUND

The use of artificial neural networks for analyzing data is known in the prior art per se. From US 2016/0328643 A1 it is known, for example, to analyze image data through a neural network, wherein a behavior of the network is analyzed to enable simplifications of the neural network.

In particular when using neural networks for analyzing sensor data for a vehicle, however, the quality of the sensor data is often not stable during vehicle operation due to various environmental influences. For example, interferences such as fog, snow and/or heavy rain can lead to reduced data quality. If these interferences are not detected, misinterpretations by the neural network may be the result. It is therefore desirable to be able to detect sensor data interferences, especially if the sensor data is to be interpreted for autonomous driving or for driver assistance systems.

SUMMARY

Aspects of the present disclosure are directed to at least partially eliminating at least some of the above disadvantages known from the prior art. Some aspects of the present disclosure are directed to improving safety during vehicle operation with regard to sensor interferences, preferably with minimal computing effort.

Exemplary methods, computer program products and systems are described in the claims provided below. Further features and details are provided in the description and the figures. Features and details described in connection with the method according to the present disclosure naturally also apply in connection with the computer program product and/or the system and vice versa so that reference is or can always be made reciprocally with respect to the disclosure of the individual aspects of the present disclosure.

In some examples, a method is disclosed for supporting the operation of a vehicle. The vehicle may be configured with a sensor unit for acquiring sensor data, in which sensor unit is provided for analysis in a trained, artificial neural network. The artificial neural network may be configured with a plurality of network elements for interim analyses of the sensor data within the neural network.

In some examples, the method includes the following steps:

- Providing the sensor data for the neural network, for example, by the sensor unit,
- Analyzing the sensor data for detecting at least one event by the neural network in the vehicle,
- Monitoring an analysis behavior of the intermediate analyses when analyzing the sensor data by a computing unit,
- Evaluating the sensor data for detecting a sensor interference as a function of the analysis behavior by the computing unit,
- Carrying out a reaction measure depending on the analysis of the sensor data by the computing unit and/or a driver assistance system of the vehicle.

In some examples, the method may further include identifying key elements of the plurality of network elements by the computing unit, a server and/or the vehicle.

In some examples, a computer program product is disclosed, wherein the program product comprises commands which, when executed by a computing unit, cause the computing unit to execute a method according to the present disclosure.

Thus, a computer program product according to the present disclosure has the same advantages as those described in detail with reference to a method according to the invention. The method may, in particular, be a computer-implemented method. The computer program product may be implemented as a computer-readable instruction code in any suitable programming language such as, for example, JAVA, C++, C#and/or Python. The computer program product may be stored on a computer-readable memory device such as a data disk, a removable disk drive, a volatile or non-volatile memory, or a built-in memory/processor. The instruction code is able to influence or control a computer or other programmable devices such that the desired functions are executed. The computer program product may further be provideable or provided in a network such as, for example, the Internet from which it can be downloaded by a user when needed. The computer program product may thus be realized both as a software and by means of one or several specific electronic circuits, i.e., in hardware or in any hybrid form, i.e., by means of software components and hardware components.

In some examples, a system is disclosed, comprising a vehicle that includes a sensor unit for acquiring sensor data. The system further comprises a computing unit for executing any of the methods of the present disclosure.

Thus, a system according to the present disclosure has the same advantages as those described in detail with reference to a method and/or a computer program product according to the present disclosure. Advantageously, the computing unit may have a processor and/or microprocessor. Furthermore, the computing unit may be integrated in the vehicle and/or a server. The computing unit may have several computing modules which are distributed decentrally. For example, one computing module of the computing unit may be integrated in the vehicle and another computing module may be integrated in the server. Preferably, the vehicle has a driver assistance system for automatically carrying out driving maneuvers.

DESCRIPTION OF THE DRAWINGS

Further advantages, features and details of the present disclosure are shown in the following description, in which embodiments of the invention are described in detail with reference to the drawings. The features mentioned in the claims and in the description can each be essential to the invention individually or in any combination. The figures show schematically:

DETAILED DESCRIPTION

Figure 1:
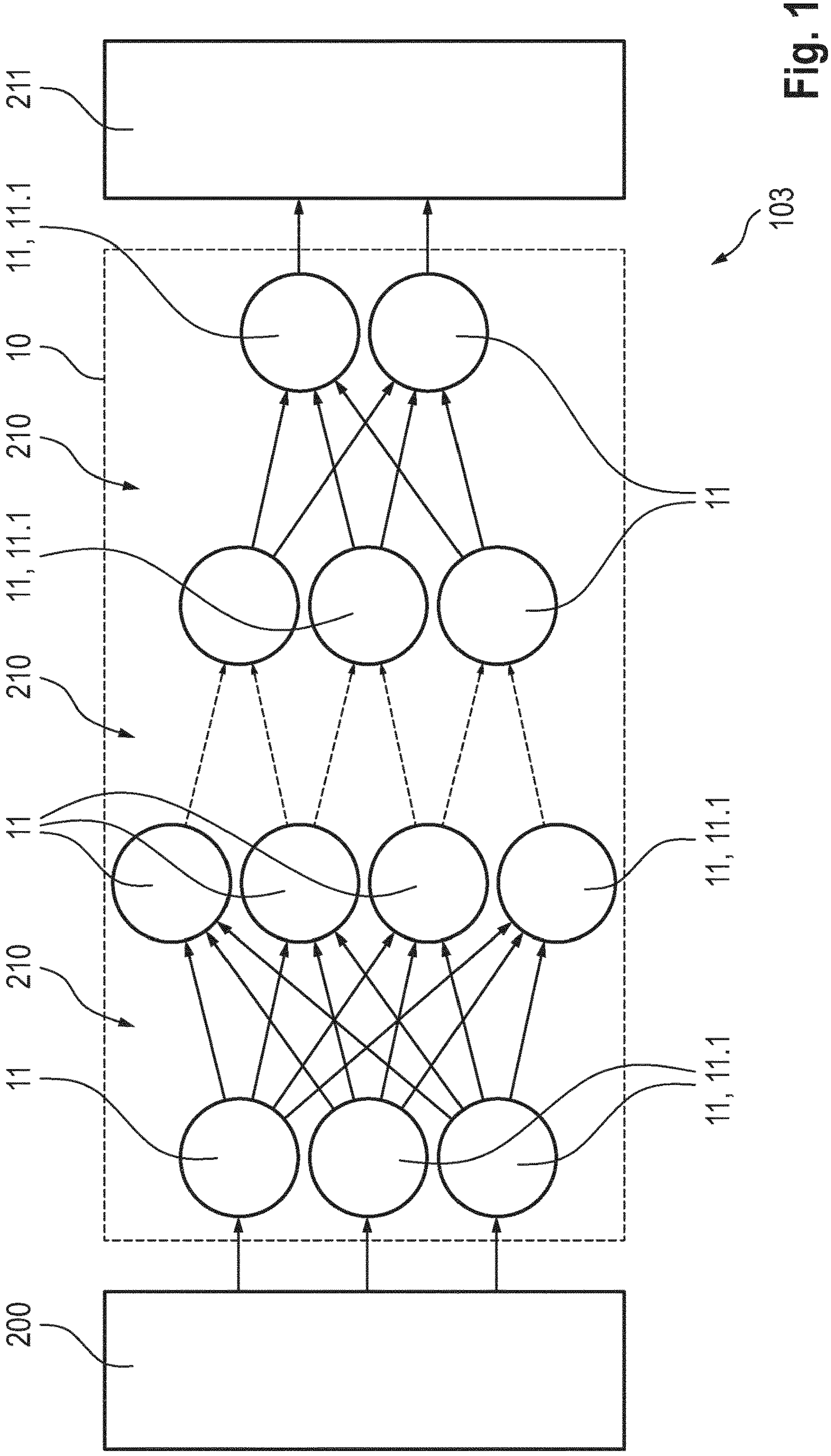
FIG. 1 illustrates an artificial neural network, according to some aspects of the present disclosure.

In the following description of various embodiments, identical reference signs are used for the same technical features even in different embodiments.

In some examples, a vehicle as disclosed herein can be operated in an at least partially automated operating mode using a driver assistance system and/or in an autonomous operating mode. The sensor unit may comprise one or more vehicle sensors. The sensor unit may include a forward-looking sensor system for detecting a vehicle environment of the vehicle. The sensor data may be, for example, image data, radar data and/or Lidar data.

The neural network may also be referred to as a neural net. The neural network is a so-called deep neural network. Preferably, the neural network is a machine learning-based network with several, preferably three or more, layers and/or parameters for processing input data and for outputting output data. The neural network may preferably be implemented in the computing unit in trained form. The neural network may be part of a detection module of the computing unit. For example, the neural network can be trained during a development process using reference data from the sensor data to be able to detect the event. Preferably, the event can be an event in a vehicle environment during operation of the vehicle.

For example, the event may comprise an appearing of another road user, such as a pedestrian or another vehicle. However, it is also contemplated that, when detecting the event, a traffic sign that the vehicle approaches is detected. It may be provided that for detecting the event, an object detection is executed when analyzing the sensor data. For this purpose, boxes may be rendered around objects in the vehicle environment. Preferably, the sensor data can be classified according to events during the analysis. In particular, the sensor data can be analyzed pixel by pixel when analyzing the sensor data. The analysis of the sensor data may be carried out completely until an overall analysis is established. However, it is also conceivable that the analysis of the sensor data is interrupted if a sensor interference is detected when evaluating the sensor data.

The network elements may, for example, be network nodes of the neural network. Preferably, the network elements may comprise kernels, network layers, network filters and/or weightings of the neural network. The interim analyses may comprise, for example, scalars, which are output by the network elements when analyzing the sensor data. When monitoring the analysis behavior, the analysis behavior of the interim analyses of some or all network elements of the neural network can be monitored, in particular analyzed. When evaluating sensor data for detecting the sensor interferences, it is possible, in particular, to check and/or determine a presence of the sensor interference. For example, it can be determined if, based on the analysis behavior, the presence of the sensor interference is sufficiently plausible. In particular, the sensor data can be classified as interference-affected and/or interference-free or as stable and/or unstable sensor data during evaluation. It is therefore conceivable that when evaluating the sensor data, it is determined whether the neural network has a high error rate when evaluating the sensor data due to the data quality of the sensor data.

In particular, the sensor interference may be an external interference of the sensor data. In particular, the sensor interference may be caused by weather conditions in the vehicle environment. For example, the sensor interference may comprise fog, heavy rain and/or the like.

The reaction measure may comprise interfering with the operation of the vehicle. However, it is also conceivable that the reaction measure includes a notification to the driver of the vehicle to inform the driver that the sensor unit is interfered with. Furthermore, the reaction measure may include a request for further sensor data to validate or falsify the sensor interference.

By monitoring the analysis behavior, the neural network itself can be analyzed to detect the sensor interference based on the behavior of the neural network. This makes it possible to detect and/or predict incorrect behavior of the neural network. As a result, misinterpretation of the sensor data can be avoided, thereby improving safety during operation of the vehicle.

Preferably, the interim analyses of the key elements are monitored when monitoring the analysis behavior. The key elements can be understood as sensitive network elements whose interim analyses behave characteristically in the event of a sensor interference. In some examples, only the interim analyses of the key elements are monitored when monitoring the analysis behavior. As a result, a required computing capacity can be reduced. It is conceivable that the identification of the key elements takes place in a separate process. However, it is also conceivable that a collection, in particular, in the form of a list and/or a catalog, of the key elements is received from the vehicle to identify the key elements. For example, the collection of key elements can be provided by a server. Thus, a behavior of the interim analyses of the key elements can represent a characteristic for detecting the sensor interference. Furthermore, identifying the key elements can reduce the computing power required for monitoring the analysis behavior and/or analyzing the sensor data.

In some examples, a calibration process is executed to identify the key elements and/or to evaluate the sensor data, in which calibration process interference-affected reference data and interference-free reference data are evaluated by the neural network, preferably with behavioral deviations of the interim analyses being recorded during the calibration process when analyzing the interference-affected reference data and interference-free reference data. The calibration process can be carried out iteratively. The interference-affected reference data can be understood to be exemplary sensor data that has a sensor interference that makes the analysis of the sensor data flawed or error-prone. The interference-free reference data can be understood as exemplary sensor data which, when the sensor data is analyzed, lead to an error-free overall result or an overall result within a tolerance range. For example, a further artificial neural network can be trained during the calibration process in that the further neural network receives the interim analyses and the reference data as input data to output data in the form of an evaluation for detecting the sensor interference and/or the key elements. The calibration process can thus improve the accuracy with which the sensor interference is detected.

In some examples, the calibration process is executed by a server, wherein the evaluation of the sensor data, the monitoring of the analysis behavior and the evaluation of the sensor data are carried out by the vehicle. For this purpose, the identified key elements, the neural network and/or an architecture of the neural network can be transmitted from the server to the vehicle. This means that the results of the calibration process can be made available to several vehicles. Furthermore, the computing load in the vehicle can be reduced. Because the analyzing of the sensor data, the monitoring of the analysis behavior and the evaluating of the sensor data is carried out by the vehicle, a real-time evaluation of the sensor data can be carried out in the vehicle at the same time to be able to react quickly in a driving situation, particularly a critical one.

In some examples, a weighting of the key elements may be performed when identifying the key elements, wherein the weighting is taken into account when evaluating the sensor data. When evaluating the sensor data for detecting the sensor interference, the weighting may comprise, for example, weighting factors. The weightings may be determined during the calibration process. For example, during the calibration process, it may be recognized that the behavior of the interim analyses of certain key elements has a stronger influence on the evaluation of the sensor data with regard to the sensor interference than the behavior of the interim analyses of other key elements. This can be taken into account by the weighting, as a result of which the sensor interference can be detected with greater accuracy.

In some examples, when evaluating the sensor data and/or monitoring an analysis behavior of the interim analyses, an averaging is performed for several interim analyses. The averaging may be performed for several network elements. However, it is also conceivable that during the averaging process, a mean value is calculated for each network element or key element in successive interim analyses. This can, for example, reduce the influence of measurement errors.

Preferably, a comparison may be performed of the analysis behavior to a reference behavior of the interim analyses when evaluating the sensor data, wherein at least one limit value for a deviation of the analysis behavior from the reference behavior for detecting the sensor interference, e.g., for detecting the presence of the sensor interference, is specified for the evaluation of the sensor data. The reference behavior can be determined during the calibration process based on the interference-free reference data. The limit value can be determined during the calibration process using the interference-affected reference data, in particular, by comparing the analysis behavior during an analysis of the interference-affected and interference-free reference data. It may be provided, for example, that the sensor interference is detected when the limit value is reached or exceeded. In particular, several limit values may be provided for the interim analyses. Thus, an advantageous detection of the sensor interference may be realized.

In some examples, the sensor data are classified with regard to an interference classification when evaluating the sensor data, wherein the reaction measure is carried out as a function of the interference classification. The interference classification may, for example, comprise the type of sensor interference. It is thus conceivable that sensor data with fog receive a different interference classification than sensor data with heavy rain. As a result, the reaction measure can be carried out tailored to the interference classification. It may be provided, for example, that the reaction measure is a controlling of driver assistance systems as a function of the interference classification. In particular, a predetermined driver assistance system may be controlled for a specific interference classification.

In some examples, a reaction measure comprises a validation process for validating the evaluation and/or analysis of the sensor data. The validation process may prevent or postpone an intervention into the driving behavior of the vehicle. In particular, this can provide an additional level of certainty when detecting the sensor interference.

In some examples, the validation process may include loading the sensor data into a further, artificial neural network which is trained for analyzing sensor data of the interference classification for detecting the event. The further neural network may be trained for analyzing sensor data with an inference due to fog. As a result, sensor data having a sensor interference can also be analyzed with regard to a sensor interference as a function of the sensor interference. The further neural network may be implemented in the vehicle or in the server.

The validation process may also include loading the sensor data into several further, trained, artificial neural networks, wherein a consolidation process is executed to obtain an overall evaluation of the sensor data with regard to the event and/or with regard to the sensor interference. During the consolidation process, the analysis behavior of interim analyses of the other neural networks can be monitored and the sensor data for detecting the sensor interference can be evaluated as a function of the analysis behavior of all further neural networks. For example, the evaluation can take into account whether a majority of the further neural networks classify the sensor data as interference-affected or interference-free. This allows validation through consolidation. For example, the further neural networks may be trained using different training data. As a result, the analysis behavior of the interim analyses of the further neural networks may differ. As a result, errors in detecting the sensor interference can be recognized and/or accuracy in detecting the sensor interference can be improved.

In some examples, the reaction measure may include an automatic triggering of a driving maneuver of the vehicle. For this purpose, a driver assistance system of the vehicle may be controlled. When the sensor interference is detected, a speed of the vehicle can be reduced and/or a driving maneuver can be executed to perform an emergency stop of the vehicle. Thus, safe operation of the vehicle can be achieved by intervening in a normal operation of the vehicle when the sensor interference is detected to avoid incorrect behavior of the vehicle due to an incorrect analysis by the neural network caused by the sensor interference.

Figure 4:
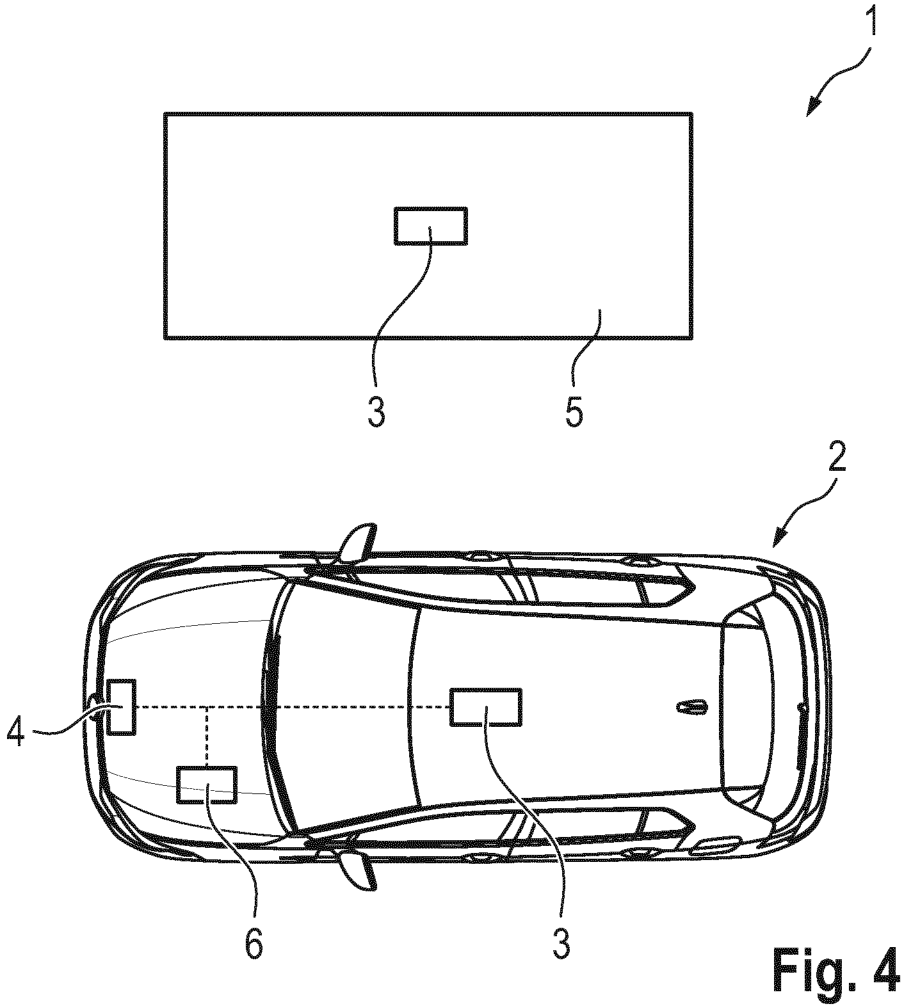
FIG. 4 illustrates a system comprising the vehicle, according to some aspects of the present disclosure.

FIG. 1 illustrates a trained, artificial neural network 10 for analyzing 103 sensor data 200 of a sensor unit 4 of a vehicle 2 according to some aspects of the present disclosure. A system 1 that includes the vehicle 2 and the sensor unit 4 is shown in FIG. 4. The neural network 10 may be implemented in a computing unit 3. The computing unit 3 is preferably integrated in the vehicle 2 and/or a server 5. As shown in FIG. 1, the neural network 10 has a plurality of network elements 11 for interim analyses 210 for analyzing the sensor data 200. The network elements 11 may comprise, for example, network layers, network filters and/or weightings of the neural network 10.

Figure 2:
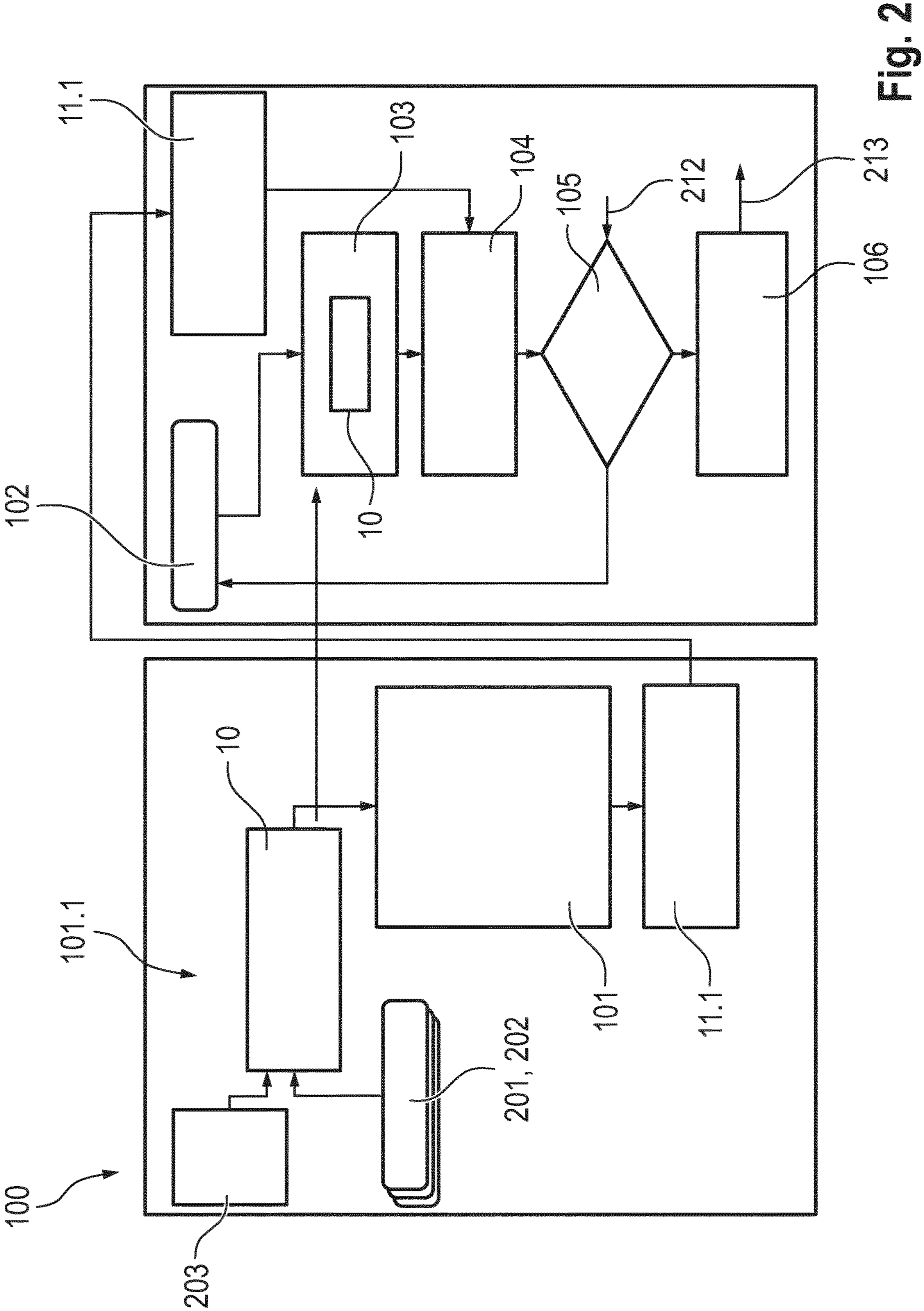
FIG. 2 illustrates a method for supporting the operation of a vehicle, according to some aspects of the present disclosure.

FIG. 2 shows a method 100 according to the present disclosure for supporting an operation of the vehicle 2 with the sensor unit 4 in a diagrammatic representation of method steps. The method 100 is preferably executed by the computing unit 3.

Advantageously, a computer program product is provided for this purpose which comprises commands, which, when executed by the computing unit 3, cause the computing unit 3 to execute the method 100.

To create an overall analysis 211 for an interpretation and/or classification of the sensor data 200 with respect to an event, the method 100 comprises providing 102 the sensor data 200 to the neural network 10 and analyzing 103 the sensor data 200 for a detection of the event by the neural network 10. For example, the event may be the appearing of an object such as another road user in a vehicle environment.

Figure 5:
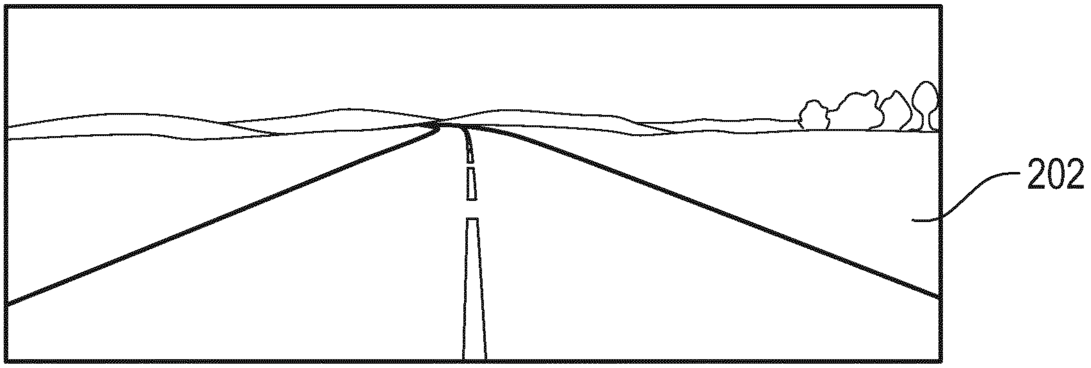
FIGS. 5 and 6 illustrate reference data for a calibration process of the method, according to some aspects of the present disclosure.
Figure 6:
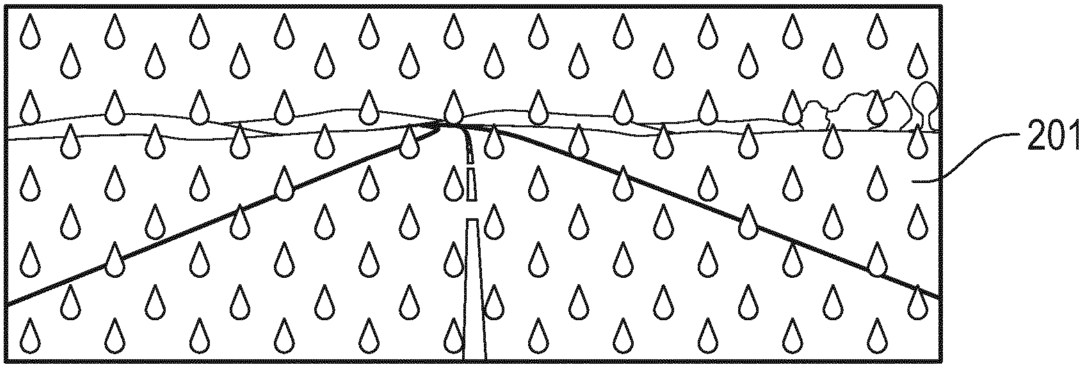

First, however, identifying 101 key elements 11.1 of the plurality of network elements 11 is provided. A calibration process 101.1 is executed for identifying 101 the key elements 11.1, in which calibration process interference-affected reference data 201 and interference-free reference data 202 are analyzed by the neural network 10. For example, if the sensor unit 4 has a camera, the reference data 201, 202 may comprise image data. An example for interference-free reference data 202 is shown in FIG. 5, while an example for interference-affected reference data 201 comprising a sensor interference in the form of rain is shown in FIG. 6. The interference-free reference data 202 may, for example, correspond to the training data of the neural network 10.

It may be provided that during the calibration process 101.1 further additional reference parameters 203 are loaded into the neural network 10. Thus, the sensor interference may, in particular, be an external interference, such as an environmental influence. In particular, behavioral deviations of the interim analyses 210 are detected during the calibration process 101.1 when analyzing 103 the interference-affected and interference-free reference data 201, 202. As a result, a characteristic behavior of the neural network 10 can be detected in the form of characteristic interim analyses 210 or a characteristic change in the interim analyses 210 to detect the sensor interference. Preferably, when identifying 101 the key elements 11.1, the key elements 11.1 can also be weighted, wherein, for example, key elements 11.1 whose interim analyses 210 behave more characteristically than other key elements 11.1 are given greater weight for detecting the sensor interference. As a result, in particular, the number of key elements 11.1 can be reduced.

Furthermore, to detect the sensor interference, monitoring 104 an analysis behavior of the interim analyses 210 when analyzing 103 the sensor data 200 is carried out in the method 100. In particular, only the interim analyses 210 of the key elements 11.1 that exhibit the characteristic behavior during the sensor interference are monitored.

This is followed by evaluating 105 the sensor data 200 to detect the sensor interference as a function of the analysis behavior, in particular, taking into account the weighting of the key elements 11.1. Additionally, or alternatively, when evaluating 105 the sensor data 200 and/or monitoring 104 the analysis behavior, averaging, in particular over time and/or across elements, may be performed for several interim analyses 210. The sensor interference is, in particular, detected through comparing the analysis behavior to a reference behavior of the interim analyses 210 when evaluating 105 the sensor data 200. The reference behavior can be deduced from the, in particular, interference-free reference data 201, 202. Furthermore, it may be provided that a limit value 212 for a deviation of the analysis behavior from the reference behavior is provided for the evaluation of the sensor data 200. The sensor interference is detected, in particular, when the limit value 212 is reached or exceeded. Furthermore, it is conceivable that several limit values 212 are provided which form a tolerance corridor in which the sensor data 200 are considered to be interference-free. It may be provided that the sensor data 200 are classified with regard to an interference classification 213.

To enable real-time analysis while at the same time requiring low computing capacity in the vehicle 2, the calibration process 101.1 is preferably executed by the server 5 and analyzing 103 the sensor data 200, monitoring 104 the analysis behavior and evaluating 105 the sensor data 200 by the vehicle 2. The server 5 and the vehicle 2 may each comprise a computing module of the computing unit 3.

As a function of evaluating 105 the sensor data 200, a reaction measure 106 is carried out, e.g., automatic triggering of a driving maneuver of the vehicle 2 by a driver assistance system 6. For example, the vehicle 2 can be slowed down when the sensor interference is present to avoid impairment of the vehicle 2 due to misinterpretation of the sensor data 200.

Figure 3:
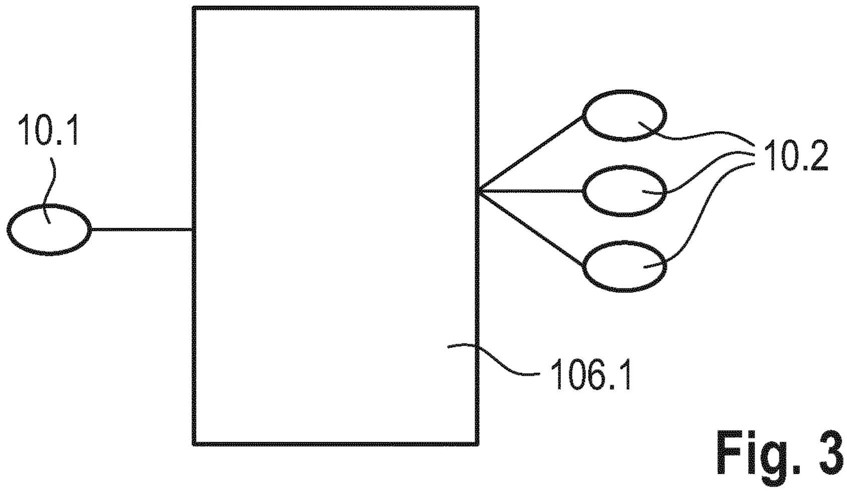
FIG. 3 illustrates a validation process of the method, according to some aspects of the present disclosure.

Furthermore, it may be provided that the reaction measure 106 includes a validation process 106.1 for validating the evaluation and/or the analysis of the sensor data 200. As shown in FIG. 3, the validation process 106.1 may comprise loading the sensor data 200 into a further artificial neural network 10.1. The further artificial neural network 10.1 may be specifically trained to recognize the event when evaluating 103 sensor data 200 of the interference classification 213. Additionally, or alternatively, the validation process 106.1 may comprise loading the sensor data 200 into several further, trained, neural networks 10.2. A consolidation process is executed by the further, trained, artificial neural networks 10.2 to obtain an overall evaluation of the sensor data 200 with regard to the event and/or with regard to the sensor interference.

By monitoring 104 the analysis behavior, the neural network 10 itself can thus be analyzed to detect the sensor interference. This makes it possible detect and/or predict incorrect behavior of the neural network 10 to avoid misinterpretation of the sensor data 200. As a result, the safety of the vehicle 2 can be improved, in particular, in an at least partially automated or autonomous driving mode, in particular, without the need for high computing capacity in the vehicle 2.

REFERENCE SIGN LIST

- 1 System
- 2 Vehicle
- 3 Computing unit
- 4 Sensor unit
- 5 Server
- 6 Driver assistance system
- 10 Trained, artificial neural network
- 10.1 Trained, artificial neural network
- 10.2 Trained, artificial neural network
- 11 Network elements
- 11.1 Key elements
- 100 Method
- 101 Identifying
- 101.1 Calibration process
- 102 Providing
- 103 Analyzing
- 104 Monitoring
- 105 Evaluating
- 106 Reaction measure

106.1 Validation process
200 Sensor data
201 Interference-affected reference data
202 Interference-free reference data
203 Reference parameter
210 Interim analyses
211 Overall analysis
212 Limit value
213 Interference classification

The invention claimed is:

1. A method for supporting the operation of a vehicle with a sensor unit for acquiring sensor data for analysis in a trained, artificial neural network comprising a plurality of network elements for interim analyses of the sensor data, the method comprising:

providing the sensor data for the trained artificial neural network;

analyzing, by the trained artificial neural network, the sensor data for detecting at least one event;

monitoring, by a computing unit, characteristics of the interim analyses generated by the plurality of network elements during the analyzing for detecting the at least one event;

evaluating, by the computing unit and based on the monitored characteristics of the interim analyses, whether the sensor data is affected by a sensor interference; and executing, by controlling a driver assistance system of the vehicle, a reaction measure for the vehicle as a function of evaluating the sensor data.

2. The method according to claim 1, wherein the plurality of network elements comprise network layers, network filters and/or weightings of the neural network.

3. The method according to claim 1, further comprising:

identifying elements of interest from the plurality of network elements; and monitoring the interim analyses of the elements of interest when monitoring the analysis behavior.

4. The method according to claim 3, wherein a calibration process is executed when identifying the elements of interest and/or for evaluating the sensor data, wherein interference-affected reference data and interference-free reference data are analyzed by the neural network, and wherein behavioral deviations of the interim analyses are detected during the calibration process when analyzing the interference-affected and interference-free reference data.

5. The method according to claim 4, wherein the calibration process is executed by a server, and wherein (i) analyzing the sensor data, (ii) monitoring the analysis behavior and (iii) evaluating the sensor data is executed by the vehicle.

6. The method according to claim 3, wherein the elements of interest are weighted, and wherein the weighting is taken into account when evaluating the sensor data.

7. The method according to claim 1, further comprising executing an averaging for several interim analyses when evaluating the sensor data and/or when monitoring an analysis behavior of the interim analyses.

8. The method according to claim 1, further comprising performing a comparison of the analysis behavior with a reference behavior of the interim analyses when evaluating the sensor data, wherein at least one limit value for a deviation of the analysis behavior from the reference behavior for detecting the sensor interference is specified for the evaluation of the sensor data.

9. The method according to claim 1, wherein the sensor data are classified with regard to an interference classification when evaluating the sensor data, and wherein the reaction measure is carried out as a function of the interference classification.

10. The method according to claim 9, wherein the reaction measure comprises a validation process for validating the evaluation and/or the analysis of the sensor data.

11. The method according to claim 10, wherein the validation process comprises loading the sensor data into a further artificial neural network that is trained for analyzing sensor data of the interference classification for detecting the at least one event.

12. The method according to claim 10, wherein the validation process comprises loading the sensor data into several further trained artificial neural networks, and executing a consolidation process to obtain an overall evaluation of the sensor data with regard to the at least one event and/or with regard to the sensor interference.

13. The method according to claim 1, wherein the reaction measure comprises an automatic triggering of a driving maneuver of the vehicle.

14. A non-transitory computer-readable medium having stored therein instructions executable by one or more processors for supporting the operation of a vehicle with a sensor unit for acquiring sensor data for analysis in a trained, artificial neural network comprising a plurality of network elements for interim analyses of the sensor data, the instructions being configured to:

provide the sensor data to the trained artificial neural network;

analyze, by the trained artificial neural network, the sensor data for detecting at least one event;

monitor, by the one or more processors, characteristics of the interim analyses generated by the plurality of network elements during the analyzing for detecting the at least one event;

evaluate, by the one or more processors and based on the monitored characteristics of the interim analyses, whether the sensor data is affected by a sensor interference; and execute, by controlling a driver assistance system of the vehicle, a reaction measure for the vehicle as a function of evaluating the sensor data.

15. The non-transitory computer-readable medium according to claim 14, further comprising:

identifying elements of interest from the plurality of network elements; and monitoring the interim analyses of the elements of interest when monitoring the analysis behavior.

16. The non-transitory computer-readable medium according to claim 15, wherein the instructions are configured to execute a calibration process is execute when identifying the elements of interest and/or for evaluating the sensor data, wherein interference-affected reference data and interference-free reference data are analyzed by the neural network, and wherein behavioral deviations of the interim analyses are detected during the calibration process when analyzing the interference-affected and interference-free reference data.

17. The non-transitory computer-readable medium according to claim 15, wherein the elements of interest are weighted, and wherein the weighting is taken into account when evaluating the sensor data.

18. The non-transitory computer-readable medium according to claim 14, further comprising executing an averaging for several interim analyses when evaluating the sensor data and/or when monitoring an analysis behavior of the interim analyses.

19. The non-transitory computer-readable medium according to claim 14, wherein the sensor data are classified with regard to an interference classification when evaluating the sensor data, and wherein the reaction measure is carried out as a function of the interference classification.

20. A system for supporting the operation of a vehicle, comprising:

a sensor unit for acquiring sensor data for analysis in a trained, artificial neural network comprising a plurality of network elements for interim analyses of the sensor data; and a computing unit, operatively coupled to the sensor unit, wherein the sensor unit and computing unit are configured to provide the sensor data to the trained artificial neural network;

analyze, by the trained artificial neural network, the sensor data for detecting at least one event by the neural network;

monitor, by the computing unit, characteristics of the interim analyses generated by the plurality of network elements during the analyzing for detecting the at least one event;

evaluate, by the computing unit and based on the monitored characteristics of the interim analyses, whether the sensor data is affected by a sensor interference; and execute, by controlling a driver assistance system of the vehicle, a reaction measure for the vehicle as a function of evaluating the sensor data.

* * * * *